(12) United States Patent
Zhang et al.

(10) Patent No.: US 11,249,611 B2
(45) Date of Patent: Feb. 15, 2022

(54) TOUCH PANEL, TOUCH DISPLAY PANEL, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Wei Zhang, Beijing (CN); Taofeng Xie, Beijing (CN); Qin Zeng, Beijing (CN); Xianhua Wang, Beijing (CN); Qidi Wu, Beijing (CN)

(73) Assignees: HEFEI XINSHENG OPTOELECTRONICS TECHNOLOGY CO., LTD, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,350

(22) Filed: Mar. 20, 2020

(65) Prior Publication Data

US 2021/0096674 A1  Apr. 1, 2021

(30) Foreign Application Priority Data

Sep. 30, 2019  (CN) .......................... 201910940445.0

(51) Int. Cl.
*G06F 3/047* (2006.01)
*G06F 3/044* (2006.01)

(52) U.S. Cl.
CPC .............. *G06F 3/047* (2013.01); *G06F 3/044* (2013.01); *G06F 3/0443* (2019.05); *G06F 3/0445* (2019.05); *G06F 3/0446* (2019.05); *G06F 2203/04112* (2013.01)

(58) Field of Classification Search
CPC ...... G06F 3/047; G06F 3/0443; G06F 3/0446; G06F 3/0445; G06F 3/044; G06F 2203/04112; G06F 3/0448; G06F 3/04164; G06F 3/0412; G06F 3/0416
See application file for complete search history.

(56) References Cited

U.S. PATENT DOCUMENTS

| 2008/0062148 | A1* | 3/2008 | Hotelling | G06F 3/0412 |
| | | | | 345/174 |
| 2010/0020032 | A1* | 1/2010 | Mamba | G06F 3/0447 |
| | | | | 345/173 |
| 2011/0096016 | A1* | 4/2011 | Yilmaz | G06F 3/0446 |
| | | | | 345/174 |
| 2014/0226083 | A1* | 8/2014 | Dunphy | G06F 3/0446 |
| | | | | 349/12 |
| 2015/0062468 | A1* | 3/2015 | Hu | G06F 3/0448 |
| | | | | 349/12 |
| 2019/0004657 | A1* | 1/2019 | Do | G06F 3/0445 |
| 2019/0102010 | A1* | 4/2019 | Knabenshue | G06F 3/04162 |

* cited by examiner

*Primary Examiner* — Patrick N Edouard
*Assistant Examiner* — Joseph P Fox
(74) *Attorney, Agent, or Firm* — Fay Sharpe LLP

(57) ABSTRACT

A touch panel, a touch display panel, and a display device are provided, and relate to the field of display technology. The touch panel may include a substrate, and a first touch electrode pattern and a second touch electrode pattern that are stacked on the substrate. The first touch electrode pattern includes a plurality of first touch traces and the second touch electrode pattern includes a plurality of second touch traces. A width of at least one end portion of at least one touch trace is less than a width of a part other than the end portion.

17 Claims, 11 Drawing Sheets

TOUCH PANEL, TOUCH DISPLAY PANEL, AND DISPLAY DEVICE

This application claims priority to Chinese Patent Application No. 201910940445.0, filed before the National Intellectual Property Administration, PRC on Sep. 30, 2019 and titled "TOUCH PANEL, TOUCH DISPLAY PANEL, AND DISPLAY DEVICE", the entire contents of which are incorporated herein by reference.

TECHNICAL FIELD

The present disclosure relates to the field of display technology, and in particular, relates to a touch panel, a touch display panel, and a display device.

BACKGROUND

A touch panel is a panel capable of receiving and responding to a touch signal of a stylus or the like. The touch panel has a relatively low sheet resistance, and is widely applied to touch notebook (NB) computers and tablet personal computers (TPC).

In the prior art, the touch panel includes a plurality of drive leads and two touch electrodes perpendicular to each other. One end of each drive lead is connected to one touch electrode, and the other end of the drive lead is connected to a drive chip. The two touch electrodes may transmit a touch signal based on the touch of a stylus.

SUMMARY

The present disclosure provides a touch panel, a touch display panel, and a display device. The technical solutions are as follows:

In one aspect, a touch panel is provided. The touch panel includes a substrate, and a first touch electrode pattern and a second touch electrode pattern that are stacked on the substrate, wherein the first touch electrode pattern includes a plurality of first touch traces arranged in a first direction, and the second touch electrode pattern includes a plurality of second touch traces arranged in a second direction, wherein the first direction intersect=the second direction;

wherein in the plurality of first touch traces and the plurality of second touch traces, a width of at least one end portion of at least one touch trace is less than a width of a part other than the end portion.

Optionally, in the plurality of first touch traces, a width of at least one end portion of at least one first touch trace on an outermost side is less than the width of the part other than the end portion.

Optionally, the substrate has a first lead region located at an end of the plurality of first touch traces and a second lead region located at an end of the plurality of second touch traces; the touch panel further includes a plurality of first drive leads that are located in the first lead region and are connected to the plurality of first touch traces in a one-to-one correspondence and a plurality of second drive leads that are located in the first lead region and the second lead region and are connected to the plurality of second touch traces in a one-to-one correspondence, wherein each first drive lead and each second drive lead are both configured to be connected to a touch controller;

wherein in the plurality of first touch traces, a width of at least one end portion of each first touch trace on an outermost side is less than the width of the part other than the end portion.

Optionally, in the plurality of first touch traces, widths of two end portions of a first touch trace most proximal to the second lead region are both less than the width of the part other than the end portions; and a width of an end portion, proximal to the first lead region, of a first touch trace most distal from the second lead region is less than the width of the part other than the end portion.

Optionally, in the plurality of second touch traces, a width of at least one end portion of at least one first touch trace on an outermost side is less than the width of the part other than the end portion.

Optionally, the substrate has a first lead region located at an end of the plurality of first touch traces and a second lead region located at an end of the plurality of second touch traces; the touch panel further includes a plurality of first drive leads that are located in the first lead region and are connected to the plurality of first touch traces in a one-to-one correspondence and a plurality of second drive leads that are located in the first lead region and the second lead region and are connected to the plurality of second touch traces in a one-to-one correspondence, wherein each first drive lead and each second drive lead are both configured to be connected to a touch controller;

wherein in the plurality of second touch traces, widths of two end portions of a second touch trace most proximal to the first lead region are both less than the width of the part other than the end portions.

Optionally, the substrate has a first lead region located at an end of the plurality of first touch traces and a second lead region located at an end of the plurality of second touch traces; the touch panel further includes a plurality of first drive leads that are located in the first lead region and are connected to the plurality of first touch traces in a one-to-one correspondence and a plurality of second drive leads that are located in the first lead region and the second lead region and are connected to the plurality of second touch traces in a one-to-one correspondence, wherein each first drive lead and each second drive lead are both configured to be connected to a touch controller;

wherein in the plurality of first drive leads and the plurality of second drive leads, lead sections that are located in the first lead region and are parallel to the first direction have a uniform total width in a lengthwise direction of the first touch trace.

Optionally, the total width of the lead sections is within the range of 3 mm to 10 mm.

Optionally, in the plurality of second drive leads, lead sections that are located in the second lead region and are parallel to the second direction have a uniform total width in a lengthwise direction of the second touch trace.

Optionally, the total width of the lead sections is within the range of 3 mm to 10 mm.

Optionally, the touch panel further includes at least one first metal block located in the first lead region, wherein each first metal block is located at a connection between one first drive lead and one first touch trace.

Optionally, the touch panel includes a plurality of first metal blocks in a one-to-one correspondence with the plurality of first drive leads, wherein each first metal block is located at a connection between one corresponding first drive lead and one first touch trace.

Optionally, in the plurality of first drive leads and the plurality of second drive leads, lead sections and the first metal block that are located in the first lead region and are parallel to the first direction have a uniform total width in a lengthwise direction of the first touch trace.

Optionally, the touch panel further includes at least one second metal block located in the second lead region, wherein each second metal block is located at a connection between one second drive lead and one second touch trace.

Optionally, the touch panel includes a plurality of second metal blocks in a one-to-one correspondence with the plurality of second drive leads, wherein each second metal block is located at a connection between one corresponding second drive lead and one second touch trace.

Optionally, in the plurality of second drive leads, lead sections and the second metal block that are located in the second lead region and are parallel to the second direction have a uniform total width in a lengthwise direction of the second touch trace.

Optionally, the first direction is perpendicular to the second direction.

In another aspect, a touch display panel is provided. The touch display panel includes a display panel and a touch panel in the above aspects.

In still another aspect, a display device is provided. The display device includes the touch display panel according to the above aspects and a touch controller.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

For clearer descriptions of the objects, technical solutions, and advantages in the present disclosure, the present disclosure is described in detail below with reference to the accompanying drawings.

Figure 1:
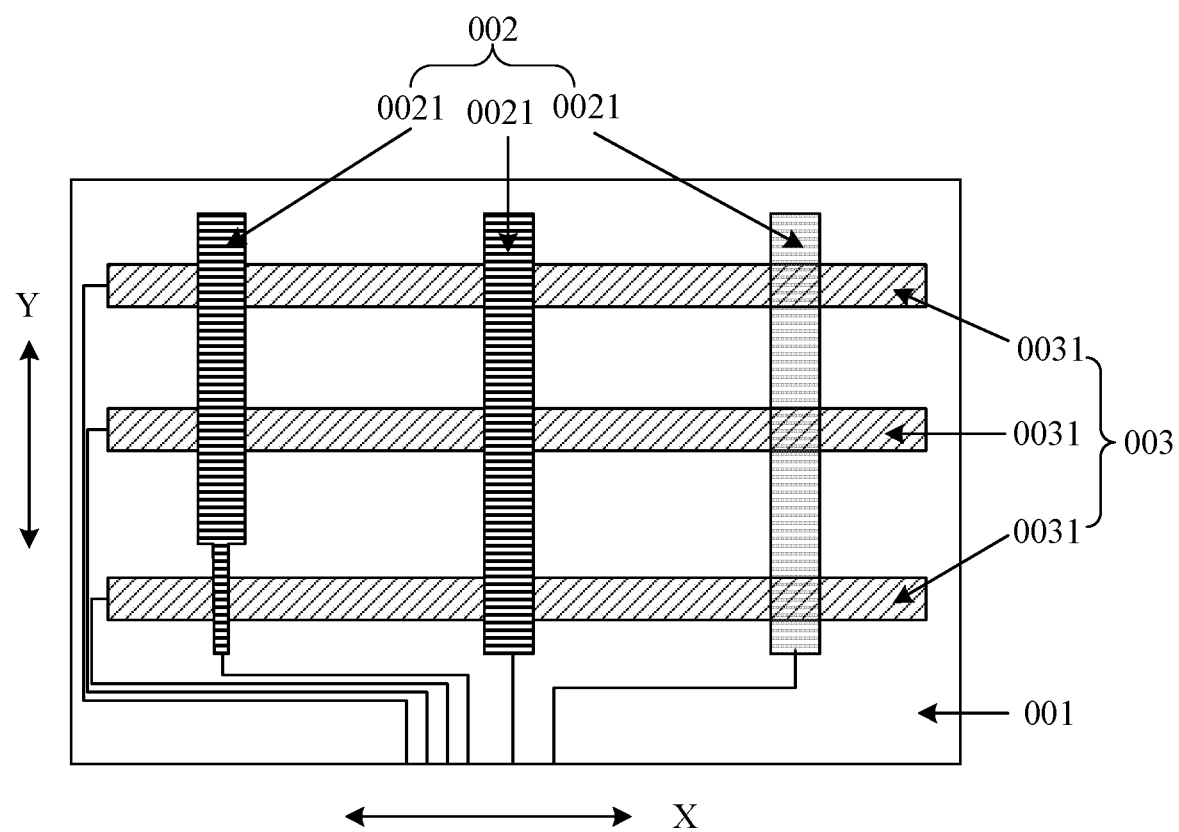
FIG. 1 is a schematic structural diagram of a touch panel according to an embodiment of the present disclosure.

FIG. 1 is a schematic structural diagram of a touch panel according to an embodiment of the present disclosure. Referring to FIG. 1, the touch panel may include a substrate 001, and a first touch electrode pattern 002 and a second touch electrode pattern 003 that are stacked on the substrate 001.

The first touch electrode pattern 002 may include a plurality of first touch traces 0021 arranged in a first direction X. The second touch electrode pattern 003 may include a plurality of second touch traces 0031 arranged in a second direction Y. The first direction X intersects the second direction Y. That is, the first direction X is not parallel to the second direction Y. That is, the plurality of first touch traces 0021 and the plurality of second touch traces 0031 may be stacked. FIG. 1 shows three first touch traces 0021 and three second touch traces 0031.

Optionally, referring to FIG. 1, the first direction X may be perpendicular to the second direction Y. In this case, a lengthwise direction of the first touch trace 0021 may be parallel to the second direction Y, and a lengthwise direction of the second touch trace 0031 may be parallel to the first direction X.

In this embodiment of the present disclosure, in the plurality of first touch traces 0021 and the plurality of second touch traces 0031, at least one end portion of at least one touch trace has a narrow trace. A width of the narrow trace may be less than a width of the touch trace other than the narrow trace. That is, a width of at least one end portion of at least one touch trace is less than a width of a part other than the end portion of the touch trace.

For example, referring to FIG. 1, in the three first touch traces 0021, a width of an end of the first touch trace 0021 located on a leftmost side is less than the width of the part other than the end portion.

An end portion of a touch trace is easily susceptible to a parasitic capacitance. Therefore, the width of at least one end portion of at least one touch trace is designed to be relatively small, such that a capacitance of the at least one end portion of the at least one touch trace is reduced, and in addition, the end portion is susceptible to a parasitic capacitance, such that the capacitance of the at least one end portion of the at least one touch trace is kept consistent with a capacitance in another region other than the end portion. Therefore, it takes a relatively short time to perform performance adjustment, for example, tilt touch adjustment or hover touch adjustment, of the touch panel.

In conclusion, this embodiment of the present disclosure provides a touch panel. The touch panel may include a substrate, and a first touch electrode pattern and a second touch electrode pattern that are stacked on the substrate. In a plurality of first touch traces included in the first touch electrode pattern and a plurality of second touch traces included in the second touch electrode pattern, a width of at least one end portion of at least one touch trace is less than a width of a part other than the end portion, such that a capacitance at the end portion is reduced, and in addition, the end portion is easily susceptible to a parasitic capacitance, such that the capacitance of the end portion is kept consistent with a capacitance in another region. Therefore, it takes a relatively short time to adjust the performance of the touch panel.

Figure 2:
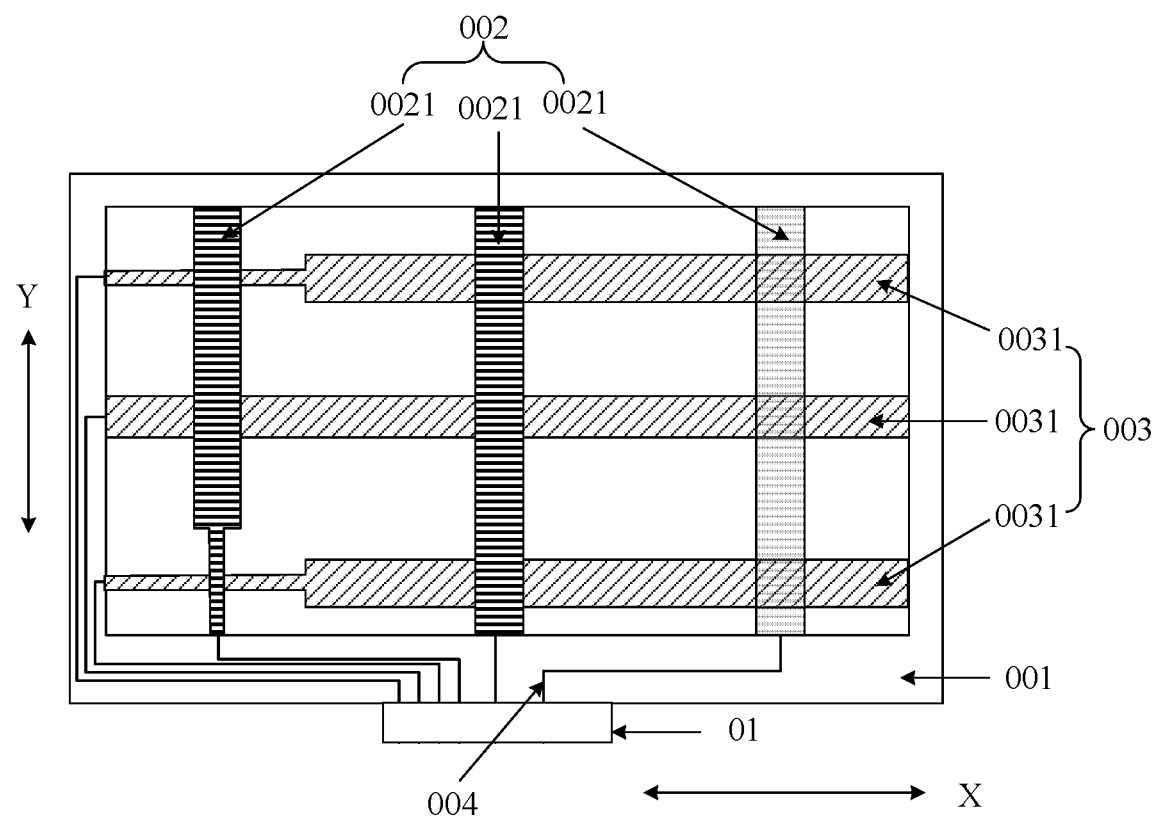
FIG. 2 is a schematic structural diagram of another touch panel according to an embodiment of the present disclosure.

FIG. 2 is a schematic structural diagram of another touch panel according to an embodiment of the present disclosure. Referring to FIG. 2, the touch panel may further include a drive lead 004. The drive lead 004 is configured to be connected to each touch trace and a touch controller 01.

In the plurality of first touch traces 0021, at least one first touch trace 0021 located on the outermost side is more proximal to an edge of the touch panel than the remaining first touch traces 0021, and the drive lead 004 connected to the touch controller 01 is disposed at the edge of the touch panel. Therefore, the drive lead 004 may generate a parasitic capacitance. That is, at least one touch trace proximal to the edge of the touch panel is most easily susceptible to the parasitic capacitance generated by the drive lead 004. Therefore, in the plurality of first touch traces 0021, a width of at least one end portion of the at least one first touch trace 0021 on the outermost side may be designed to be relatively small. In this way, a capacitance of at least one end portion of at least one touch trace on the outermost side may be kept consistent with a capacitance in another region other than the end portion. Therefore, it takes a relatively short time to adjust the performance of the touch panel.

Optionally, in the plurality of first touch traces 0021, a width of at least one end portion of each first touch trace 0021 located on the outermost side may be designed to be relatively small.

In the plurality of second touch traces 0031, at least one second touch trace 0031 located on the outermost side is more proximal to the edge of the touch panel than the remaining second touch traces 0031, and the drive lead 004 connected to the touch controller 01 is disposed at the edge of the touch panel. Therefore, the drive lead 004 may generate a parasitic capacitance. That is, the at least one second touch trace 0031 proximal to the edge of the touch panel is most easily susceptible to the parasitic capacitance generated by the drive lead 004. Therefore, in the plurality of second touch traces 0031, a width of at least one end portion of the at least one second touch trace 0031 on the outermost side may be designed to be relatively small. In this way, a capacitance of at least one end portion of the at least one second touch trace 0031 on the outermost side may be kept consistent with a capacitance in another region other than the end portion. Therefore, it takes a relatively short time to adjust the performance of the touch panel.

For example, FIG. 2 shows three first touch traces 0021 and three second touch traces 0031. In the three first touch traces 0021, a width of one end portion of the first touch trace 0021 located on the left side is relatively small. In the three second touch traces 0031, a width of one end portion of the second touch trace 0031 located on the upper side and a width of one end portion of the second touch trace 0031 located on the lower side are relatively small.

Figure 3:
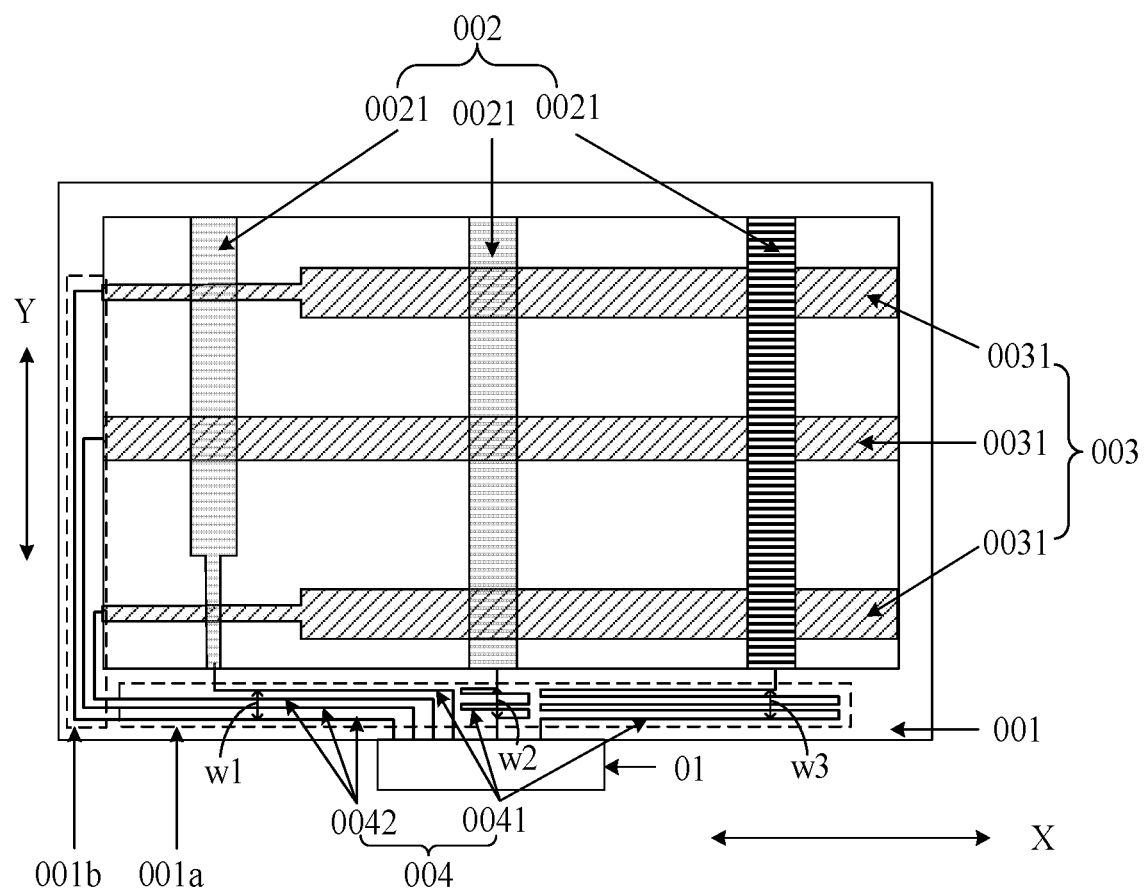
FIG. 3 is a schematic structural diagram of still another touch panel according to an embodiment of the present disclosure.

Referring to FIG. 3, the substrate 001 has a first lead region 001a located at an end of the plurality of first touch traces 0021 and a second lead region 001b located at an end of the plurality of second touch traces 0031. The touch panel may further include a plurality of first drive leads 0041 that are located in the first lead region 001a and are connected to the plurality of first touch traces 0021 in a one-to-one correspondence and a plurality of second drive leads 0042 that are located in the first lead region 001a and the second lead region 001b and are connected to the plurality of second touch traces 0031 in a one-to-one correspondence. Each first drive lead 0041 and each second drive lead 0042 may both be configured to be connected to the touch controller 01.

The touch controller 01 may be disposed independently from the substrate 001, and may be connected to a drive lead by a flexible printed circuit (FPC). In addition, as shown in FIG. 3, the touch controller 01 may be located at an end of the first touch trace 0021 in the middle. That is, the touch controller 01 may have a relatively small gap from the first touch trace 0021 located in the middle and may have a relatively large gap from the first touch traces 0021 located at the edges.

In this embodiment of the present disclosure, in the plurality of first drive leads 0041 and the plurality of second drive leads 0042, lead sections that are located in the first lead region 001a and are parallel to a first direction X have a uniform width in the lengthwise direction (for example, a second direction Y) of the first touch trace 0021.

Each first drive lead 0041 needs to be connected to the touch controller 01, and the touch controller 01 is located at an end of the first touch trace 0021 in the middle. Therefore, when each first drive lead 0041 is connected to a corresponding first touch trace 0021, the lead sections that extend in the first direction X in the first lead region 001a have different lengths. For example, a length of the lead section, extending in the first direction X in the first lead region 001a, of the first drive lead 0041 connected to the first touch trace 0021 located at an edge is relatively large, and a length of the lead section, extending in the first direction X in the first lead region 001a, of the first drive lead 0041 connected to the first touch trace 0021 located in the middle is relatively small. For example, the first drive lead 0041 connected to the first touch trace 0021 located in the middle may not need to include the lead section that extends in the first direction X.

In addition, referring to FIG. 3, each second drive lead 0042 needs to pass through the first lead region 001a to be connected to the corresponding second touch traces 0031 in the second lead region 001b, and the lead section of each second drive lead 0042 in the first lead region 001a extends in the first direction X. In this case, ends, proximal to the first lead region 001a, of the first touch traces 0021 are adjacent to different quantities of lead sections extending in the first direction X. That is, there are different densities of traces in regions in the first lead region 001a, and as a result there are different parasitic capacitances in the regions adjacent to the ends, proximal to the first lead region 001a, of the first touch traces 0021. To provide as uniform parasitic capacitances as possible in the regions, adjacent to the ends, proximal to the first lead region 001a, of the first touch traces 0021, in the plurality of first drive leads 0041 and the plurality of second drive leads 0042, the lead sections that are located in the first lead region 001a and are parallel to the first direction X may have a uniform total width in the lengthwise direction (for example, the second direction Y) of the first touch trace 0021.

A part of the first drive lead 0041 may be wound in the first lead region 001a in the lengthwise direction of the first touch trace 0021, such that lead sections that are in the first lead region 001a and are parallel to the first direction X have a uniform total width in the lengthwise direction of the first touch trace 0021. A quantity of turns in which each first drive lead 0041 is wound may be set according to an actual case, and it only needs to be ensured that after winding, the lead sections that are in the first lead region 001a and are parallel to the first direction X have a uniform total width in the lengthwise direction of the first touch trace 0021.

For example, FIG. 3 shows three first touch traces 0021 and three first drive leads 0041 connected to the three first touch traces 0021 in a one-to-one correspondence. A plurality of lead sections, extending in the first direction X, of the second drive leads 0042 are further arranged on a side, distal from the first touch trace 0021, of the first drive lead 0041 connected to the first touch trace 0021 located on the left side. Therefore, the first drive lead 0041 connected to the first touch trace 0021 located in the middle and the first drive lead 0041 connected to the first touch trace 0021 located on the right side may be wound. In this way, in the first lead region 001*a*, a total width w1 of the lead sections extending in the first direction X in a left side region may be equal to a total width w2 of the lead sections extending in the first direction X in the middle region and equal to a total width w3 of the lead sections extending in the first direction X in a right side region.

The lead sections in the first lead region 001*a* have a uniform total width in the lengthwise direction of the first touch trace 0021, such that parasitic capacitances generated by the lead sections located in the first lead region 001*a* may have the same influence on the first touch traces 0021, a width of the end portion of each first touch trace 0021 may be adjusted according to a degree of influence of the parasitic capacitances on the first touch trace 0021, and it may be determined whether two ends of each first touch trace 0021 need to be designed to be relatively small.

Optionally, the total width of the lead sections that are in the first lead region 001*a* and are parallel to the first direction X in the lengthwise direction of the first touch trace 0021 may be within the range of 3 mm to 10 mm. For example, the width of the lead sections may be 5 mm, that is, w1=w2=w3=5 mm.

Figure 4:
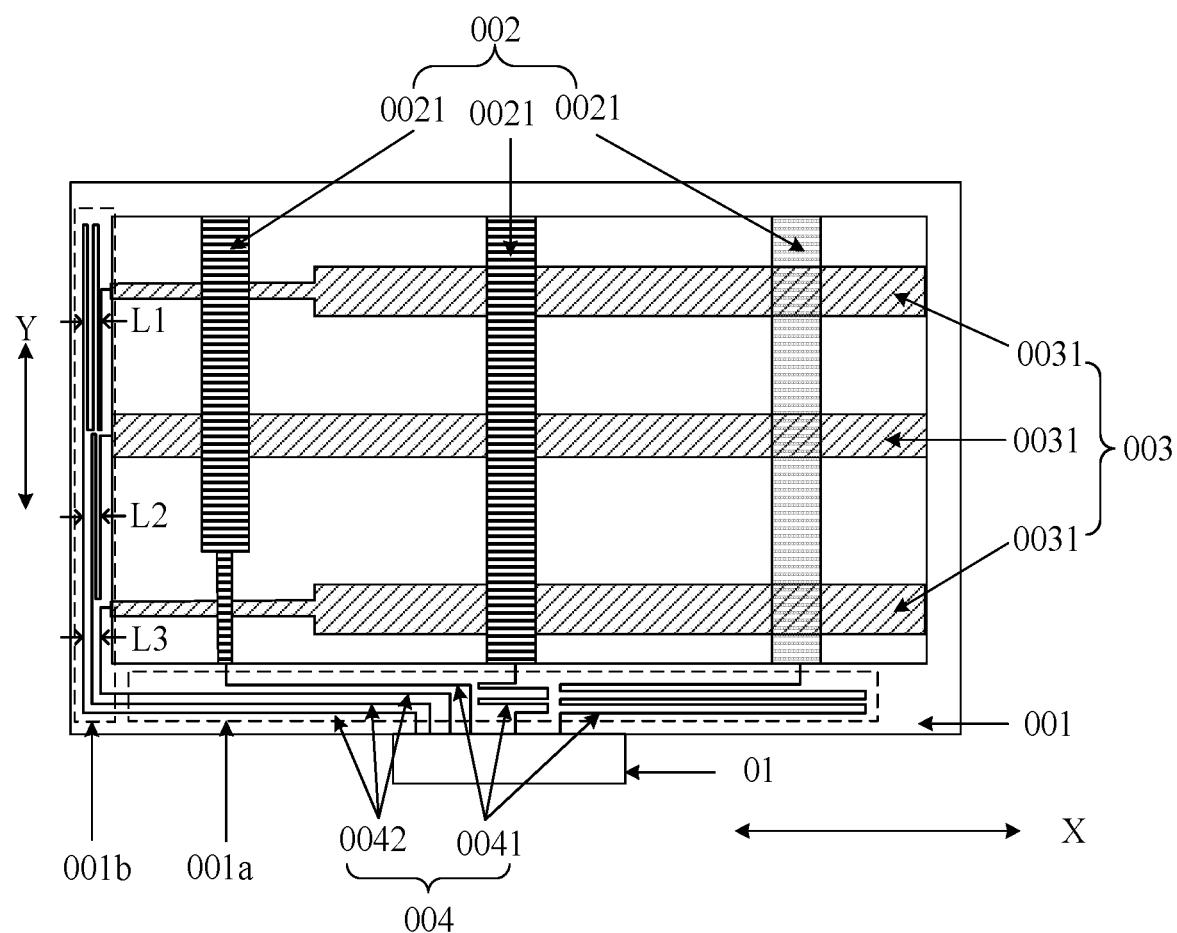
FIG. 4 is a schematic structural diagram of yet still another touch panel according to an embodiment of the present disclosure.

Referring to FIG. 4, in this embodiment of the present disclosure, in the plurality of second drive leads 0042, lead sections that are located in the second lead region 001*b* and are parallel to the second direction Y have a uniform total width in the lengthwise direction of the second touch trace 0031.

Each second drive lead 0042 needs to be connected to the touch controller 01, and the touch controller 01 is located at the end of the first touch trace 0021 in the middle. Therefore, when each second drive lead 0042 is connected to a corresponding second touch trace 0031, the second drive lead 0042 needs to first pass through the first lead region 001*a* in the first direction X and then pass through the second lead region 001*b* in the second direction Y to be connected to the second touch trace 0031. In addition, because the plurality of second touch traces 0031 have different positions in the second direction Y, lead sections, extending in the second direction Y in the second lead region 001*b*, of the plurality of second drive leads 0042 connected to the plurality of second touch traces 0031 in a one-to-one correspondence have different lengths.

For example, the lead section, extending in the second lead region 001*b* in the second direction Y, of the second drive lead 0042 connected to the second touch trace 0031 proximal to the touch controller 01 has a relatively short length, and the lead section, extending in the second lead region 001*b* in the second direction Y, of the second drive lead 0042 connected to the second touch trace 0031 more distal from the touch controller 01 has a relatively large length. In this way, ends, proximal to the second lead region 001*b*, of the second touch traces 0031 are adjacent to different quantities of lead sections extending in the second direction Y. That is, there are different densities of traces in regions in the second lead region 001*b*, and as a result there are different parasitic capacitances in the regions adjacent to the ends, proximal to the second lead region 001*b*, of the second touch traces 0031. Therefore, to provide as uniform parasitic capacitances as possible in the regions, adjacent to the second lead region 001*b*, of the second touch traces 0031, in the plurality of second drive leads 0042, lead sections that are located in the second lead region 001*b* and are parallel to the second direction Y may have a uniform total width in the lengthwise direction (for example, the first direction X) of the second touch trace 0031.

To ensure that the lead sections that are in the second lead region 001*b* and are parallel to the second direction Y have a uniform total width in the lengthwise direction of the second touch trace 0031, a part of the second drive lead 0042 may be wound in the second lead region 001*b* in the lengthwise direction of the second touch trace 0031. For example, the second drive lead 0042 connected to the second touch trace 0031 that is relatively more distal from the first lead region 001*a* may be wound. A quantity of turns in which the second drive lead 0042 is wound may be set according to an actual case, and it only needs to be ensured that after winding, the lead sections that are in the second lead region 001*b* and are parallel to the second direction Y have a uniform total width in the lengthwise direction of the second touch trace 0031.

For example, FIG. 4 shows three second touch traces 0031 and three second drive leads 0042 connected to the three second touch traces 0031 in a one-to-one correspondence. A plurality of lead sections of the second drive leads 0042 extending in the second direction Y are further arranged on a side, distal from the second touch trace 0031, of the second drive lead 0042 connected to the second touch trace 0031 located on the lower side. Therefore, the second drive lead 0042 connected to the second touch trace 0031 located in the middle and the second drive lead 0042 connected to the second touch trace 0031 located on the upper side may be wound. In this way, in the second lead region 001*b*, a total width L1 of the lead sections extending in the second direction Y in an upper side region may be equal to a total width L2 of the lead sections extending in the second direction Y in the middle region and equal to a total width L3 of the lead sections extending in the second direction Y in a lower side region.

The lead sections in the second lead region 001*b* have a uniform total width in the lengthwise direction of the second touch trace 0031, such that parasitic capacitances generated by the lead sections located in the second lead region 001*b* may have the same influence on the second touch traces 0031, a width of the end portion of each second touch trace 0031 may be adjusted according to a degree of influence of the parasitic capacitances on the second touch trace 0031, and it may be determined whether two ends of each second touch trace 0031 need to be designed to be relatively small.

Optionally, the total width of the lead sections that are in the second lead region 001*b* and are parallel to the second direction Y in the lengthwise direction of the second touch trace 0031 may be within the range of 3 mm to 10 mm. For example, the width of the lead sections may be 5 mm, that is, L1=L2=L3=5 mm.

Figure 5:
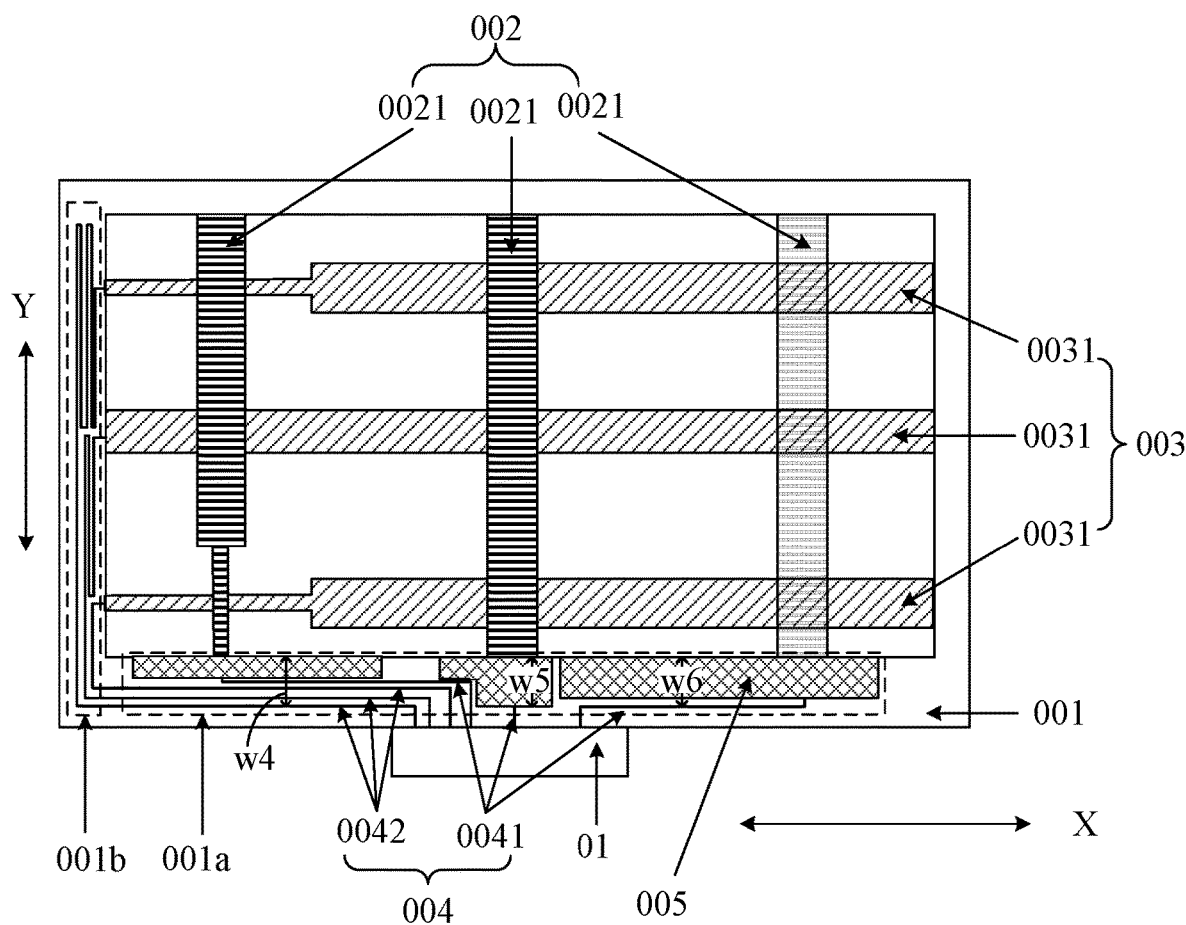
FIG. 5 is a schematic structural diagram of yet still another touch panel according to an embodiment of the present disclosure.

FIG. 5 is a schematic structural diagram of still another touch panel according to an embodiment of the present disclosure. Referring to FIG. 5, the touch panel may further include: at least one first metal block 005 located in a first lead region 001*a*, and each first metal block 005 may be located at a connection between one first drive lead 0041 and one first touch trace 0021. The first drive lead 0041 may be connected to the first metal block 005, and the first metal block 005 may be connected to the first touch trace 0021, such that the first drive lead 0041 may be connected to the first touch trace 0021. That is, the first drive lead 0041 may be connected to the first touch trace 0021 by the first metal block 005.

In an optional implementation, referring to FIG. 5, the touch panel may include a plurality of first metal blocks 005 that are in a one-to-one correspondence with the plurality of first drive leads 0041. Each first metal block 005 may be located at a connection between one corresponding first drive lead 0041 and one first touch trace 0021. That is, a quantity of the first metal blocks 005 included in the touch panel may be the same as a quantity of the first drive leads 0041.

For example, FIG. 5 shows three first touch traces 0021, three first drive leads 0041, and three first metal blocks 005 separately located between the three first drive leads 0041 and the three first touch traces 0021.

In this embodiment of the present disclosure, in the plurality of first drive leads 0041 and the plurality of second drive leads 0042, the lead sections and the first metal block 005 that are located in the first lead region 001*a* and are parallel to a first direction X may have a uniform total width in a lengthwise direction of the first touch trace 0021. The first metal block 005 is disposed at a connection between each first drive lead 0041 in the first lead region 001*a* and the first touch trace 0021, a part of the first metal block 005 has a relatively large width in the lengthwise direction of the first touch trace 0021, and a part of the first metal block 005 has a relatively small width in the lengthwise direction of the first touch trace 0021, such that it is ensured that the lead sections and the first metal block 005 that are in the first lead region 001*a* and are parallel to the first direction X have a uniform total width in the lengthwise direction of the first touch trace 0021, for example, w4=w5=w6. In this way, parasitic capacitances generated by the first drive lead 0041 and the first metal block 005 that are located in the first lead region 001*a* may have the same influence on the first touch traces 0021, such that it is determined whether two ends of each first touch trace 0021 need to be designed to be relatively small.

Figure 6:
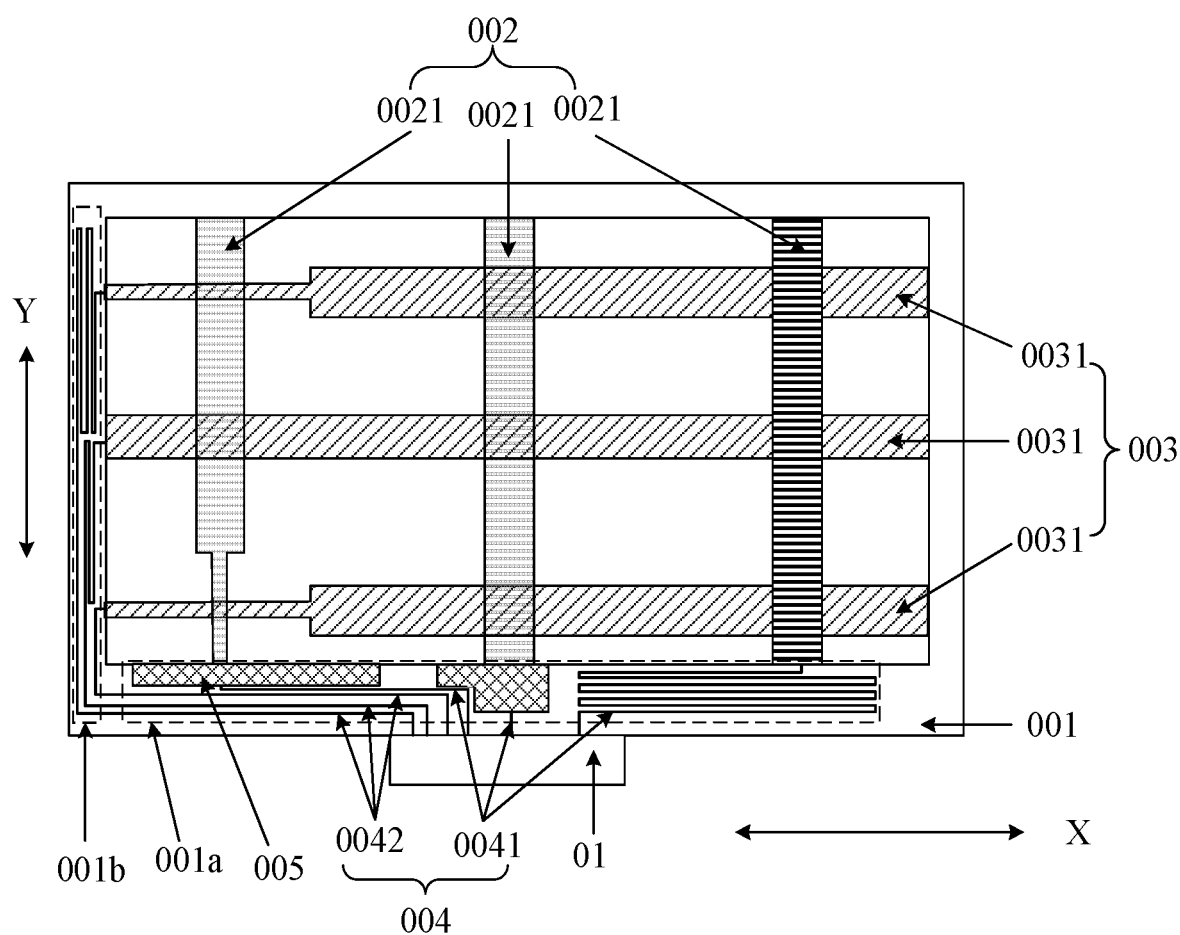
FIG. 6 is a schematic structural diagram of yet still another touch panel according to an embodiment of the present disclosure.

In another optional implementation, referring to FIG. 6, a quantity of the first metal blocks 005 included in the touch panel may be less than a quantity of the first drive leads 0041. For example, FIG. 6 shows three first touch traces 0021, three first drive leads 0041, and two first metal blocks 005.

In this embodiment of the present disclosure, a first metal block 005 may be disposed at a connection between a part of the first drive lead 0041 in the first lead region 001*a* and the first touch trace 0021, a part of the first metal block 005 is relatively large in the lengthwise direction of the first touch trace 0021, and a part of the first metal block 005 is relatively small in the lengthwise direction of the first touch trace 0021. To ensure that in the first lead region 001*a*, a total width of the lead sections in a region without a first metal block 005 in the lengthwise direction of the first touch trace 0021 is the same as a total width of the lead sections and a first metal block 005 that are in a region with the first metal block 005 in the lengthwise direction of the first touch trace 0021, a part of the first drive lead 0041 in a region without a first metal block 005 in the first lead region 001*a* may be wound, to ensure that the lead sections and the first metal block 005 that are in the first lead region 001*a* and are parallel to the first direction X have a uniform total width in the lengthwise direction of the first touch trace 0021, such that parasitic capacitances generated by the first drive leads 0041 and the first metal block 005 that are located in the first lead region 001*a* have the same influence on the first touch traces 0021, such that it is determined whether two ends of each first touch trace 0021 need to be designed to be relatively small.

Figure 7:
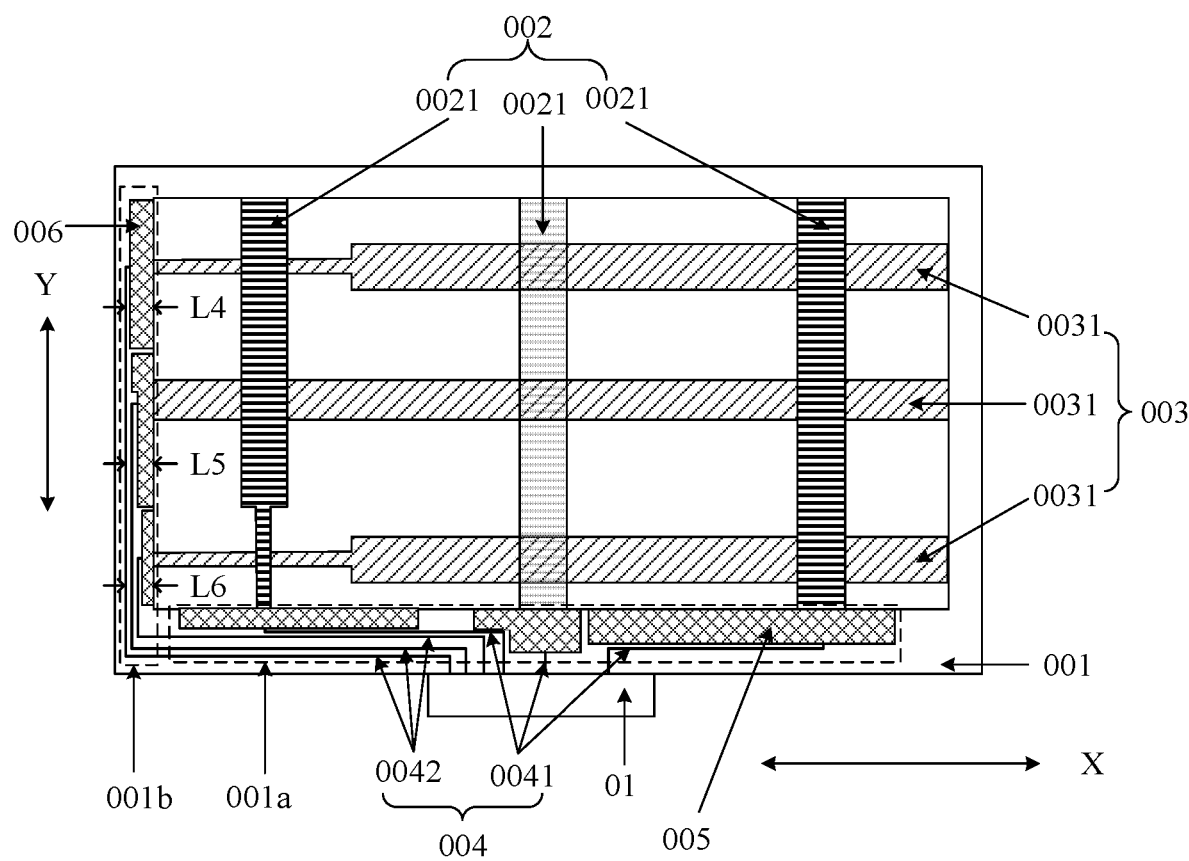
FIG. 7 is a schematic structural diagram of yet still another touch panel according to an embodiment of the present disclosure.

Further referring to FIG. 7, the touch panel may further include at least one second metal block 006 located in a second lead region 001*b*. Each second metal block 006 is located at a connection between one second drive lead 0042 and one second touch trace 0031. The second drive lead 0042 may be connected to the second metal block 006, and the second metal block 006 may be connected to the second touch trace 0031, such that the second drive lead 0042 may be connected to the second touch trace 0031. That is, the second drive lead 0042 may be connected to the second touch trace 0031 by the second metal block 006.

In an optional implementation, referring to FIG. 7, the touch panel may include a plurality of second metal blocks 006 in a one-to-one correspondence with the plurality of second drive leads 0042. Each second metal block 006 may be located at a connection between one corresponding second drive lead 0042 and one second touch trace 0031. That is, a quantity of the second metal blocks 006 included in the touch panel may be the same as a quantity of the second drive leads 0042.

For example, FIG. 7 shows three second touch traces 0031, three second drive leads 0042, and three second metal blocks 006 separately located between the three second drive leads 0042 and the three second touch traces 0031.

In this embodiment of the present disclosure, in the plurality of second drive leads 0042, the lead sections and the second metal block 006 that are located in the second lead region 001*b* and are parallel to a second direction Y may have a uniform total width in a lengthwise direction of the second touch trace 0031. In the second lead region 001*b*, the second metal block 006 is disposed at a connection between each second drive lead 0042 and the second touch trace 0031, a part of the second metal block 006 has a relatively large width in the lengthwise direction of the second touch trace 0031, and a part of the second metal block 006 has a relatively small width in the lengthwise direction of the second touch trace 0031, such that it is ensured that the lead sections and the second metal block 006 that are in the second lead region 001*b* and are parallel to the second direction Y have a uniform total width in the lengthwise direction of the second touch trace 0031, for example, L4=L5=L6. In this way, parasitic capacitances generated by the second drive leads 0042 and the second metal blocks 006 that are in the second lead region 001*b* may have the same influence on the second touch traces 0031, such that it is determined whether two ends of each second touch trace 0031 need to be designed to be relatively small.

Figure 8:
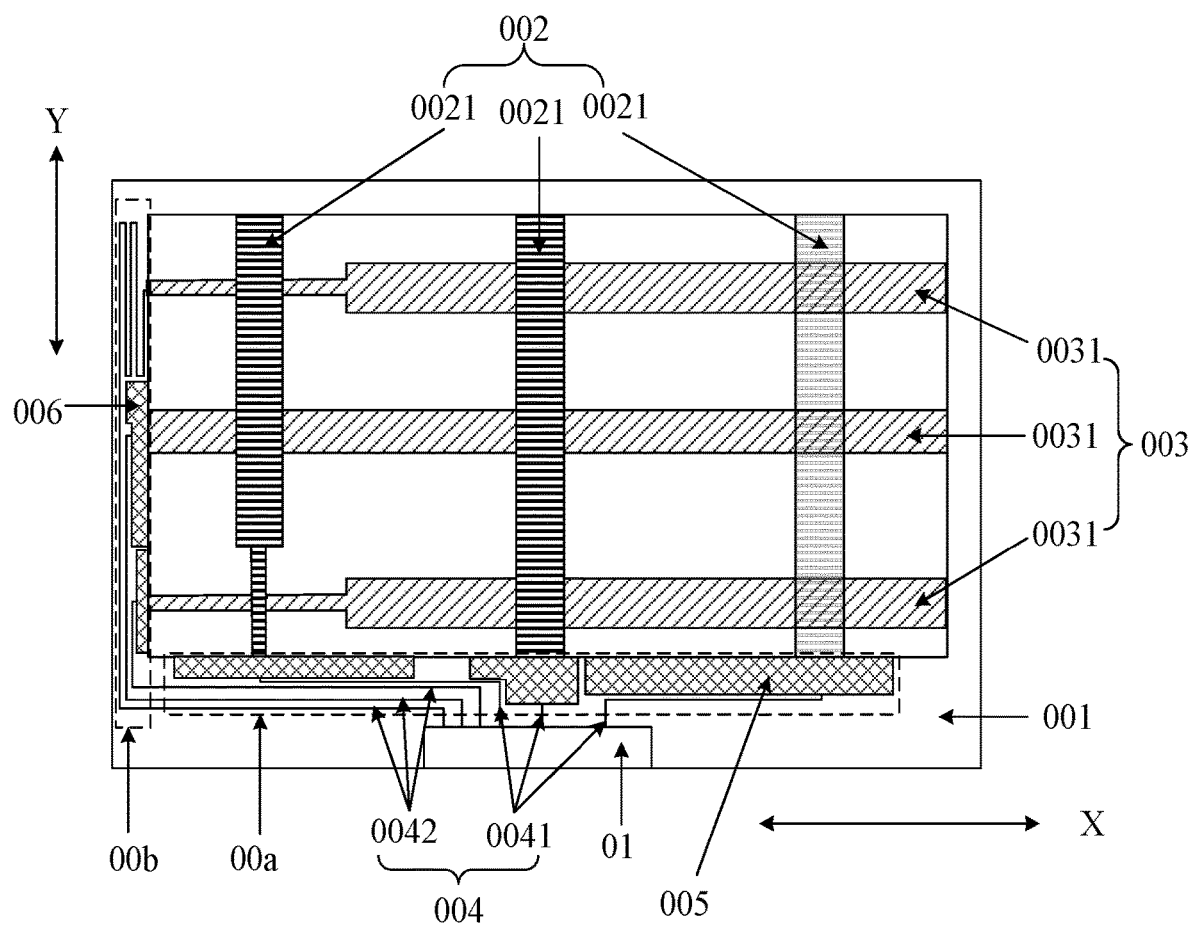
FIG. 8 is a schematic structural diagram of yet still another touch panel according to an embodiment of the present disclosure.

In another optional implementation, referring to FIG. 8, a quantity of the second metal blocks 006 included in the touch panel may be less than a quantity of the second drive leads 0042. For example, FIG. 8 shows three second touch traces 0031, three second drive leads 0042, and two second metal blocks 006.

In this embodiment of the present disclosure, a second metal block 006 may be disposed at a connection between a part of the first drive lead 0041 and the first touch trace 0021 in the second lead region 001*b*, a part of the second metal block 006 has a relatively large width in the lengthwise direction of the second touch trace 0031, and a part of the second metal block 006 has a relatively small width in the lengthwise direction of the second touch trace 0031. To ensure that in the second lead region 001*b*, a total width of the lead sections in a region without a second metal block 006 in the lengthwise direction of the second touch trace 0031 is the same as a total width of the lead sections and a second metal block 006 in a region with the second metal blocks 006 in the lengthwise direction of the second touch trace 0031, such that a part of the second drive lead 0042 in a region without a second metal block 006 in the second lead region 001b may be wound, to ensure that the lead sections and the second metal block 006 that are in the second lead region 001b and are parallel to the second direction Y have a uniform total width in the lengthwise direction of the second touch trace 0031, such that parasitic capacitances generated by the second drive leads 0042 and the second metal block 006 that are located in the second lead region 001b have the same influence on the second touch trace 0031, such that it is determined whether two ends of each second touch trace 0031 need to be designed to be relatively small.

It needs to be noted that, in the touch panel, the second touch trace 0031 proximal to the first lead region 001a is more easily susceptible to a parasitic capacitance than the remaining second touch traces 0031, the first touch trace 0021 proximal to the second lead region 001b is more easily susceptible to a parasitic capacitance than the remaining first touch traces 0021, and the first touch traces 0021 (that is, the first touch trace 0021 most proximal to the second lead region 001b and the first touch trace 0021 most distal from the second lead region 001b) located at edges and the second touch traces 0031 (that is, the second touch trace 0031 most proximal to the first lead region 001a and the second touch trace 0031 most distal from the first lead region 001a) located at edges are more easily susceptible to a parasitic capacitance than the remaining touch traces.

Figure 9:
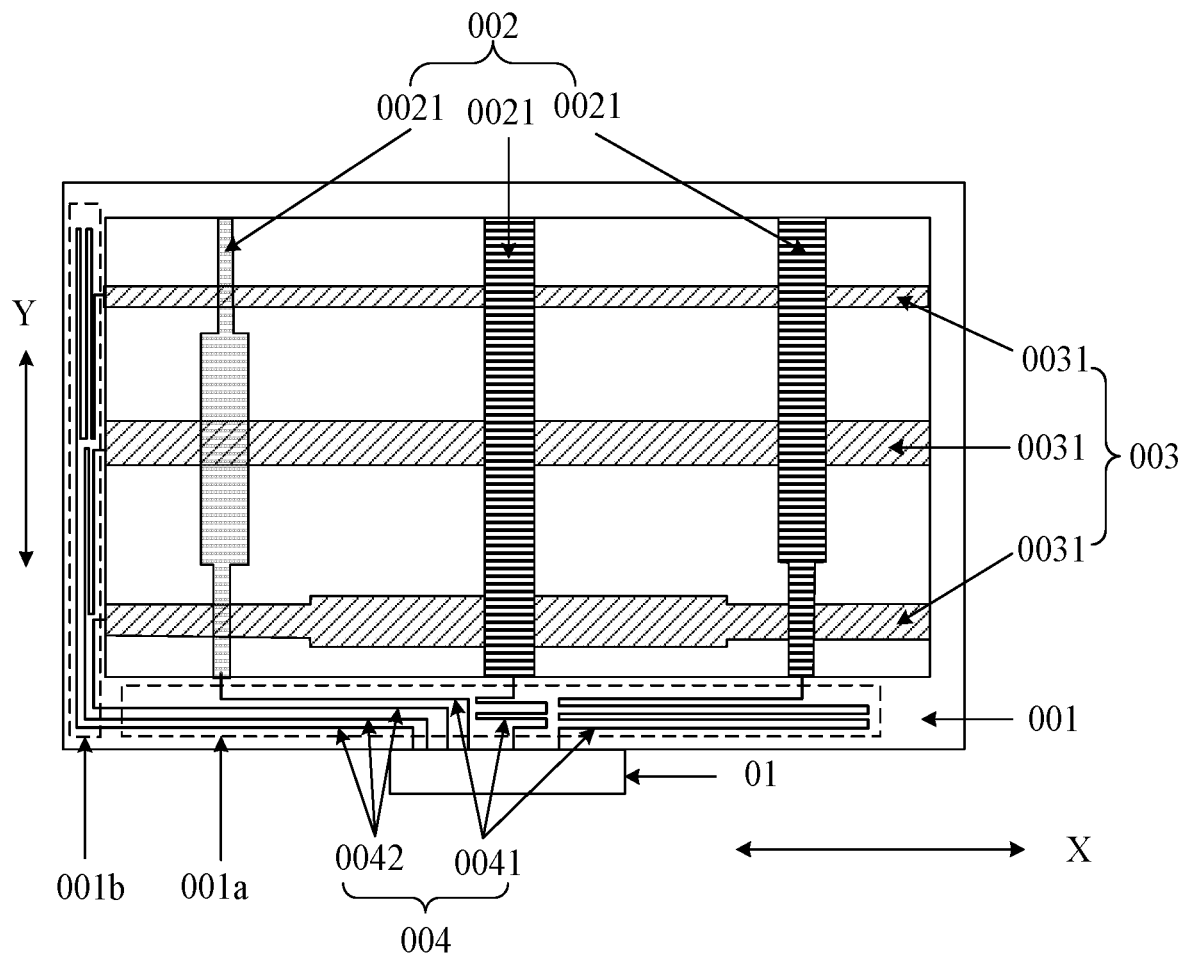
FIG. 9 is a schematic structural diagram of yet still another touch panel according to an embodiment of the present disclosure.
Figure 10:
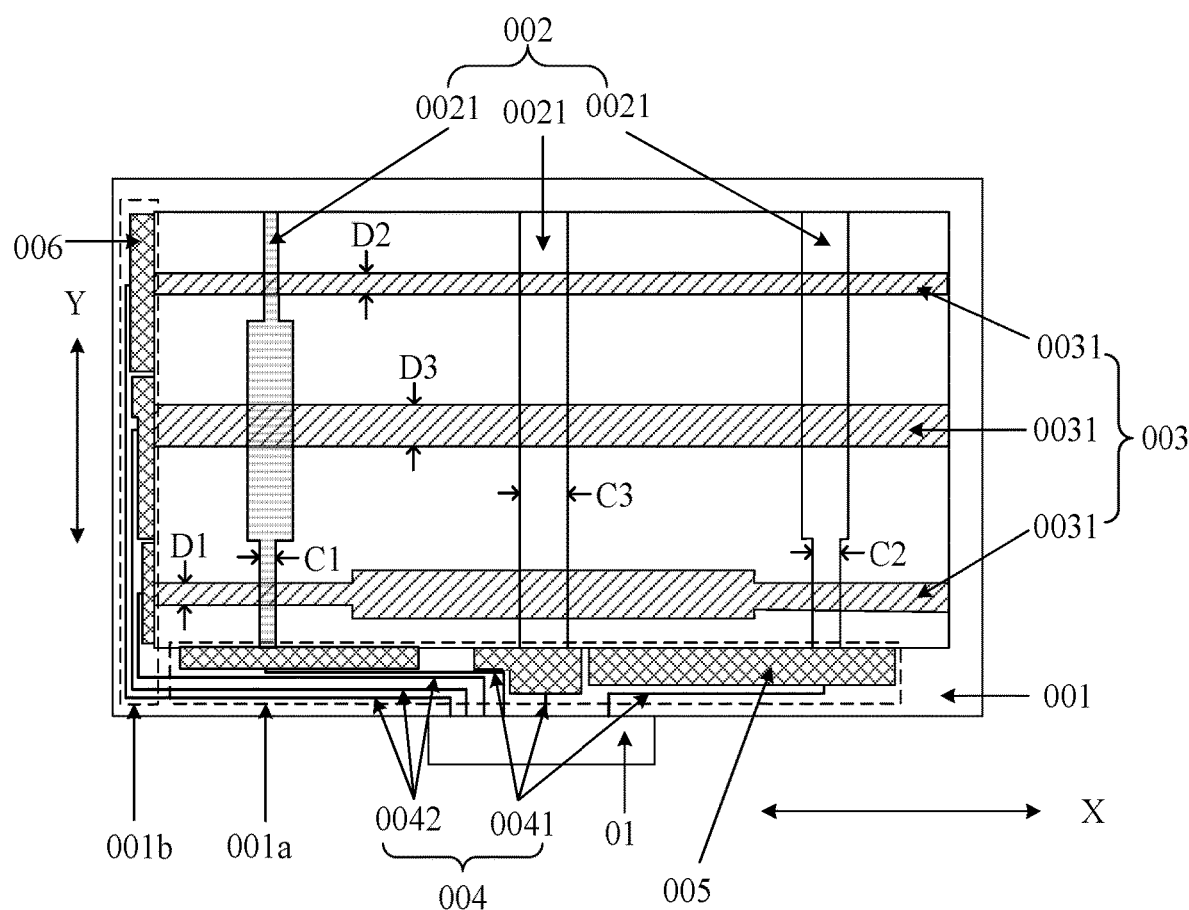
FIG. 10 is a schematic structural diagram of yet still another touch panel according to an embodiment of the present disclosure.

Therefore, referring to FIG. 9 and FIG. 10, two ends of the second touch trace 0031 most proximal to the first lead region 001a may both have relatively small widths, two ends of the first touch trace 0021 most proximal to the second lead region 001b may both have relatively small widths, and an end (that is, an end portion proximal to the first lead region 001a), proximal to the first drive leads 0041, of the first touch trace 0021 that is located at an edge and is most distal from the second lead region 001b, has a relatively small width, such that capacitances in the regions in the touch panel is kept consistent. In addition, a capacitance tester is used to test that capacitance uniformity of the touch panel provided in this embodiment of the present disclosure is less than 10%, the capacitance uniformity is relatively desirable, and the time taken to adjust the performance of the touch panel may be reduced.

The capacitance uniformity may be a ratio of a difference between a maximum capacitance value and a minimum capacitance value in the touch panel to a sum of the maximum capacitance value and the minimum capacitance value. That is, the capacitance uniformity may satisfy: uniformity=(Cmax−Cmin)/(Cmax+Cmin), where Cmax is the maximum capacitance value in the touch panel, and Cmin is the minimum capacitance value in the touch panel.

In this embodiment of the present disclosure, a capacitance tester may be used in advance to measure capacitances in regions in the touch panel when an end portion of a touch trace is not designed to be relatively small (that is, the touch trace has consistent widths), lead sections (or lead sections and first metal blocks) in the first lead region 001a have different total widths in the lengthwise direction of the first touch trace 0021, and lead sections (or lead sections and second metal blocks) in the second lead region 001b have different total widths in the lengthwise direction of the second touch trace 0031, such that it may be determined, according to the measured capacitances in the regions, whether an end portion of each touch trace in the touch panel needs to be designed to be relatively small. That is, a width of the touch trace in the touch panel may be designed according to the actually measured capacitances in the regions of the touch panel.

End portions of a plurality of touch traces may have the same width or may have different widths, and in the plurality of touch traces, a width of a part other than an end portion may be designed to be relatively small. This embodiment of the present disclosure is not limited thereto.

Optionally, referring to FIG. 9 and FIG. 10, in the three first touch traces 0021, a width C1 of an end portion of the first touch trace 0021 on the left side may be less than a width C2 of an end portion of the first touch trace 0021 on the right side, and the width C2 may be less than a width C3 of the first touch trace 0021 located in the middle. That is, C1<C2<C3. In addition, in the three second touch traces 0021, a width D2 of the second touch trace 0031 located on the upper side may be less than a width D1 of an end portion of the second touch trace 0031 located on the lower side (that is, proximal to the first lead region 001a), and the width D1 may be less than a width D3 of the second touch trace 0031 located at in the middle. That is, D2<D1<D3.

Optionally, the touch panel provided in this embodiment of the present disclosure may be a One Glass Metal Mesh (OGM) touch panel.

Optionally, the materials of the first touch trace 0021 and the second touch trace 0031 may include at least one of aluminum, copper, an aluminum alloy, and a copper alloy.

It needs to be noted that, a first touch electrode pattern 002 may be disposed on a surface of the substrate 001, and a second touch electrode pattern 003 may be disposed on a surface, distal from the substrate 001, of the first touch electrode pattern 002. Alternatively, the second touch electrode pattern 003 may be disposed on a surface of the substrate 001, and the first touch electrode pattern 002 may be disposed on a surface, distal from the substrate 001, of the second touch electrode pattern 003. In this embodiment of the present disclosure, the arrangement positions of the first touch electrode pattern 002 and the second touch electrode pattern 003 are not limited.

An insulating layer may be disposed between the first touch electrode pattern 002 and the second touch electrode pattern 003, and the plurality of first touch traces 0021 included in the first touch electrode pattern 002 and the plurality of second touch traces 0031 included in the second touch electrode pattern 003 may be prevented from affecting each other, thereby ensuring consistent capacitances in regions of the touch panel.

In conclusion, this embodiment of the present disclosure provides a touch panel. The touch panel may include a substrate, and a first touch electrode pattern and a second touch electrode pattern that are stacked on the substrate. In a plurality of first touch traces included in the first touch electrode pattern and a plurality of second touch traces included in the second touch electrode pattern, a width of at least one end portion of at least one touch trace is less than a width of a part other than the end portion, such that a capacitance at the end portion is reduced, and in addition, the end portion is easily susceptible to a parasitic capacitance, such that the capacitance at the end portion is kept consistent with a capacitance in another region. Therefore, it takes a relatively short time to adjust the performance of the touch panel.

Figure 11:
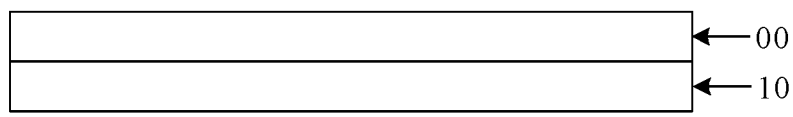
FIG. 11 is a schematic structural diagram of a touch display panel according to an embodiment of the present disclosure.

An embodiment of the present disclosure further provides a touch display panel. As shown in FIG. 11, the touch display panel may include a display panel 10 and the touch panel 00 in the above embodiments. The touch panel 00 may be the touch panel 00 shown in any one of FIG. 1 to FIG. 10.

Figure 12:
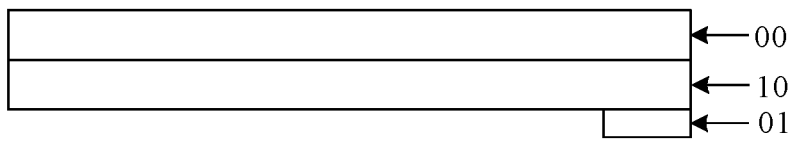
FIG. 12 is a schematic structural diagram of a display device according to an embodiment of the present disclosure.

An embodiment of the present disclosure further provides a display device. As shown in FIG. 12, the display device may include the touch display panel provided in the above embodiments and a touch controller 01. The touch controller 01 may be connected to each drive lead in the touch panel 00 by an FPC. The display device may be any product or member having a display function such as a liquid crystal display device, electronic paper, an organic light-emitting diode (OLED) display device, an active-matrix OLED (AMOLED) display device, a mobile phone, a TPC, a television, a display, an NB computer or a digital frame.

The above descriptions are merely optional embodiments of the present disclosure, and are not intended to limit the present disclosure. Within the spirit and principles of the present disclosure, any modifications, equivalent replacements, improvements, etc., are within the protection scope of the present disclosure.

What is claimed is:

1. A touch panel, comprising a substrate, and a first touch electrode pattern and a second touch electrode pattern that are stacked on the substrate;

wherein the first touch electrode pattern comprises a plurality of first touch traces arranged in a first direction, and the second touch electrode pattern comprises a plurality of second touch traces arranged in a second direction, the first direction intersecting the second direction;

wherein in the plurality of first touch traces and the plurality of second touch traces, a width of at least one end portion of at least one touch trace is less than a width of each portion of the at least one touch trace other than the end portion;

wherein in the plurality of first touch traces, a width of at least one end portion of at least one first touch trace on an outermost side is less than a width of each portion of the at least one first touch trace on the outermost side other than the end portion;

wherein the substrate has a first lead region located at an end of the plurality of first touch traces and a second lead region located at an end of the plurality of second touch traces; and the touch panel further comprises a plurality of first drive leads that are located in the first lead region and are connected to the plurality of first touch traces in a one-to-one correspondence and a plurality of second drive leads that are located in the first lead region and the second lead region and are connected to the plurality of second touch traces in a one-to-one correspondence, each first drive lead and each second drive lead being both configured to be connected to a touch controller;

wherein in the plurality of first touch traces, the width of at least one end portion of each first touch trace on the outermost side is less than the width of each portion of each first touch trace on the outermost side other than the end portion; and wherein in the plurality of first touch traces, widths of two end portions of a first touch trace most proximal to the second lead region are both less than a width of each portion of the first touch trace most proximal to the second lead region other than the end portion; and a width of an end portion, most proximal to the first lead region, of a first touch trace most distal from the second lead region is less than a width of each portion of the first touch trace most distal from the second lead region other than the end portion.

2. The touch panel of claim 1, wherein in the plurality of second touch traces, a width of at least one end portion of at least one second touch trace on an outermost side is less than a width of each portion of the at least one second touch trace on the outermost side other than the end portion.

3. The touch panel of claim 2, wherein in the plurality of second touch traces, widths of two end portions of a second touch trace most proximal to the first lead region are both less than a width of each portion of the second touch trace most proximal to the first lead region other than the end portions.

4. The touch panel of claim 1, wherein in the plurality of first drive leads and the plurality of second drive leads, lead sections that are located in the first lead region and are parallel to the first direction have a uniform total width in a lengthwise direction of the first touch trace.

5. The touch panel of claim 4, wherein the total width of the lead sections that are located in the first lead region and are parallel to the first direction in the lengthwise direction of the first touch trace is within the range of 3 mm to 10 mm.

6. The touch panel of claim 1,
wherein in the plurality of second drive leads, lead sections that are located in the second lead region and are parallel to the second direction have a uniform total width in a lengthwise direction of the second touch trace.

7. The touch panel of claim 6, wherein the total width of the lead sections is within the range of 3 mm to 10 mm.

8. The touch panel of claim 1, wherein the touch panel further comprises at least one first metal block located in the first lead region, each first metal block being located at a connection between one first drive lead and one first touch trace.

9. The touch panel of claim 8, wherein the touch panel comprises a plurality of first metal blocks in a one-to-one correspondence with the plurality of first drive leads, each first metal block being located at a connection between one corresponding first drive lead and one first touch trace.

10. The touch panel of claim 8, wherein
in the plurality of first drive leads and the plurality of second drive leads, lead sections and the first metal block that are located in the first lead region and are parallel to the first direction have a uniform total width in a lengthwise direction of the first touch trace.

11. The touch panel of claim 1, wherein the touch panel further comprises at least one second metal block located in the second lead region, each second metal block being located at a connection between one second drive lead and one second touch trace.

12. The touch panel of claim 11, wherein the touch panel comprises a plurality of second metal blocks in a one-to-one correspondence with the plurality of second drive leads, each second metal block being located at a connection between one corresponding second drive lead and one second touch trace.

13. The touch panel of claim 11, wherein
in the plurality of second drive leads, lead sections and the second metal block that are located in the second lead region and are parallel to the second direction have a uniform total width in a lengthwise direction of the second touch trace.

14. The touch panel of claim 1, wherein the first direction is perpendicular to the second direction.

15. The touch panel of claim 1, wherein the first direction is perpendicular to the second direction; in the plurality of second touch traces, widths of two end portions of a second touch trace most proximal to the first lead region are both less than a width of each portion of the second touch trace most proximal to the first lead region other than the end portions;
    in the plurality of first drive leads and the plurality of second drive leads, lead sections that are located in the first lead region and are parallel to the first direction have a uniform total width in a lengthwise direction of the first touch trace, the total width of the lead sections being within the range of 3 mm to 10 mm; and
    in the plurality of second drive leads, lead sections that are located in the second lead region and are parallel to the second direction have a uniform total width in a lengthwise direction of the second touch trace, the total width of the lead sections being within the range of 3 mm to 10 mm.

16. A touch display panel, comprising a display panel and a touch panel, wherein the touch panel comprises a substrate, and a first touch electrode pattern and a second touch electrode pattern that are stacked on the substrate;
    wherein the first touch electrode pattern comprises a plurality of first touch traces arranged in a first direction, and the second touch electrode pattern comprises a plurality of second touch traces arranged in a second direction, the first direction intersecting the second direction;
    wherein in the plurality of first touch traces and the plurality of second touch traces, a width of at least one end portion of at least one touch trace is less than a width of each portion of the at least one touch trace other than the end portion;
    wherein in the plurality of first touch traces, a width of at least one end portion of at least one first touch trace on an outermost side is less than a width of each portion of the at least one first touch trace on the outermost side other than the end portion;
    wherein the substrate has a first lead region located at an end of the plurality of first touch traces and a second lead region located at an end of the plurality of second touch traces; and the touch panel further comprises a plurality of first drive leads that are located in the first lead region and are connected to the plurality of first touch traces in a one-to-one correspondence and a plurality of second drive leads that are located in the first lead region and the second lead region and are connected to the plurality of second touch traces in a one-to-one correspondence, each first drive lead and each second drive lead being both configured to be connected to a touch controller;
    wherein in the plurality of first touch traces, the width of at least one end portion of each first touch trace on the outermost side is less than the width of each portion of each first touch trace on the outermost side other than the end portion; and
    wherein in the plurality of first touch traces, widths of two end portions of a first touch trace most proximal to the second lead region are both less than a width of each portion of the first touch trace most proximal to the second lead region other than the end portion; and
    a width of an end portion, most proximal to the first lead region, of a first touch trace most distal from the second lead region is less than a width of each portion of the first touch trace most distal from the second lead region other than the end portion.

17. A display device, comprising a touch display panel and a touch controller, wherein the touch display panel comprises a display panel and a touch panel, the touch panel comprising a substrate, and a first touch electrode pattern and a second touch electrode pattern that are stacked on the substrate;
    wherein the first touch electrode pattern comprises a plurality of first touch traces arranged in a first direction, and the second touch electrode pattern comprises a plurality of second touch traces arranged in a second direction, the first direction intersecting the second direction;
    wherein in the plurality of first touch traces and the plurality of second touch traces, a width of at least one end portion of at least one touch trace is less than a width of each portion of the at least one touch trace other than the end portion;
    wherein in the plurality of first touch traces, a width of at least one end portion of at least one first touch trace on an outermost side is less than a width of each portion of the at least one first touch trace on the outermost side other than the end portion;
    wherein the substrate has a first lead region located at an end of the plurality of first touch traces and a second lead region located at an end of the plurality of second touch traces; and the touch panel further comprises a plurality of first drive leads that are located in the first lead region and are connected to the plurality of first touch traces in a one-to-one correspondence and a plurality of second drive leads that are located in the first lead region and the second lead region and are connected to the plurality of second touch traces in a one-to-one correspondence, each first drive lead and each second drive lead being both configured to be connected to a touch controller;
    wherein in the plurality of first touch traces, the width of at least one end portion of each first touch trace on the outermost side is less than the width of each portion of each first touch trace on the outermost side other than the end portion; and
    wherein in the plurality of first touch traces, widths of two end portions of a first touch trace most proximal to the second lead region are both less than a width of each portion of the first touch trace most proximal to the second lead region other than the end portion; and
    a width of an end portion, most proximal to the first lead region, of a first touch trace most distal from the second lead region is less than a width of each portion of the first touch trace most distal from the second lead region other than the end portion.

\* \* \* \* \*